United States Patent
Tamura et al.

(10) Patent No.: US 8,692,154 B2
(45) Date of Patent: Apr. 8, 2014

(54) METHOD OF MANUFACTURING ELECTRONIC COMPONENT LEAD USING LASER BEAM

(75) Inventors: Hiroaki Tamura, Kawasaki (JP); Fumihiko Tokura, Kawasaki (JP); Michinao Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 12/894,715

(22) Filed: Sep. 30, 2010

(65) Prior Publication Data
US 2011/0073577 A1 Mar. 31, 2011

(30) Foreign Application Priority Data
Sep. 30, 2009 (JP) ................................ 2009-228381

(51) Int. Cl.
*B23K 1/005* (2006.01)

(52) U.S. Cl.
USPC ............... 219/121.85; 219/85.13; 219/121.69

(58) Field of Classification Search
USPC ............. 219/121.68, 121.69, 121.72, 121.85, 219/121.76, 121.73, 121.66, 85.13
See application file for complete search history.

(56) References Cited

U.S. PATENT DOCUMENTS

| | | | |
|---|---|---|---|
| 6,822,191 B2 * | 11/2004 | De Steur et al. | 219/121.69 |
| 2003/0006217 A1 * | 1/2003 | Dance | 219/121.64 |
| 2004/0061952 A1 * | 4/2004 | Coufal et al. | 359/754 |
| 2006/0163222 A1 * | 7/2006 | Dance et al. | 219/121.69 |
| 2009/0173893 A1 * | 7/2009 | Tanaka et al. | 250/492.2 |

FOREIGN PATENT DOCUMENTS

| | | |
|---|---|---|
| JP | 7-16370 U | 3/1995 |
| JP | 9-55244 A | 2/1997 |
| JP | 10-41042 A | 2/1998 |
| JP | 2008-119735 A | 5/2008 |

* cited by examiner

*Primary Examiner* — Geoffrey S Evans
(74) *Attorney, Agent, or Firm* — Fujitsu Patent Center

(57) ABSTRACT

An electronic component lead manufacturing method includes irradiating a first laser beam to a second layer with a solder wettability higher than a first layer, the second layer being laminated on the outside of the first layer of the lead used by the electronic component, and exposing the first layer from the second layer based on the irradiating of the first laser beam, and forming a projecting part near a region irradiated by a second laser beam by irradiating the second laser beam to the exposed first layer.

6 Claims, 22 Drawing Sheets

METHOD OF MANUFACTURING ELECTRONIC COMPONENT LEAD USING LASER BEAM

CROSS-REFERENCE TO RELATED APPLICATIONS

This application is based upon and claims the benefit of priority of the prior Japanese Patent Application No. 2009-228381, filed on Sep. 30, 2009, the entire contents of which are incorporated herein by reference.

FIELD

The embodiments discussed herein are related to an electronic component lead manufacturing method and manufacturing device.

BACKGROUND

There is a known technique of connecting electronic component leads to the items the leads are connected by solder. Japanese Laid-open Patent Publication No. 10-41042, Laid-open Patent Publication No. 2008-119735, Japanese Laid-open Patent Publication No. 9-55244, and Japanese Laid-open Utility Model No. 7-16370 disclose techniques related to solder connections.

Electronic component leads may be connected to printed boards by solder. Electronic components may also have leads that are connected to electronic component bodies by solder. When this type of solder is melted, the solder may extend up the lead due to capillary action. Accordingly, the amount of solder that contributes to the connection of the lead and the connected item may be decreased.

SUMMARY

According to an embodiment, an electronic component lead manufacturing method includes irradiating a first laser beam to a second layer with a solder wettability higher than a first layer, the second layer being laminated on the outside of the first layer of the lead used by the electronic component, and exposing the first layer from the second layer based on the irradiating of the first laser beam, and forming a projecting part near a region irradiated by a second laser beam by irradiating the second laser beam to the exposed first layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
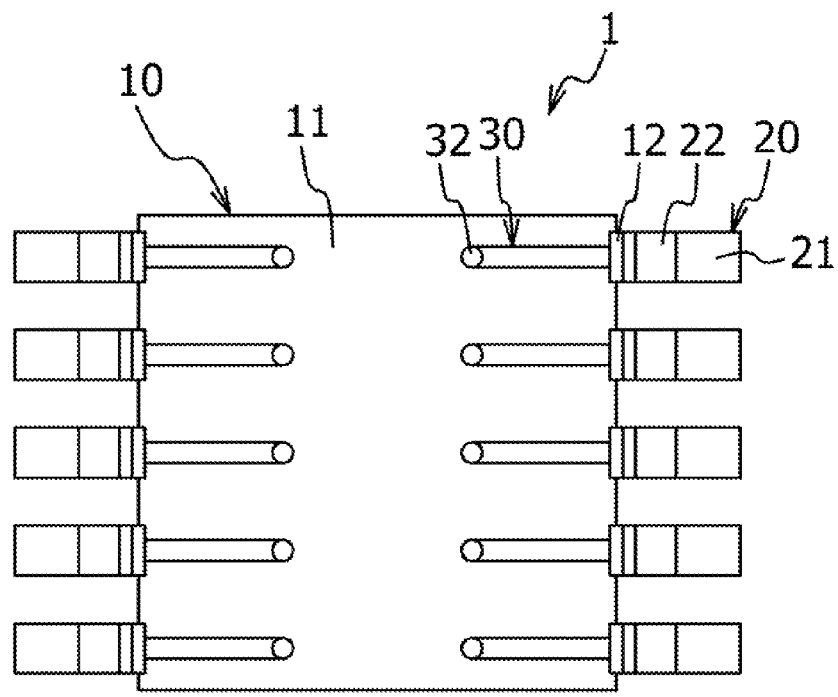
FIGS. 1A and 1B are illustrations describing a connector.
Figure 1B:
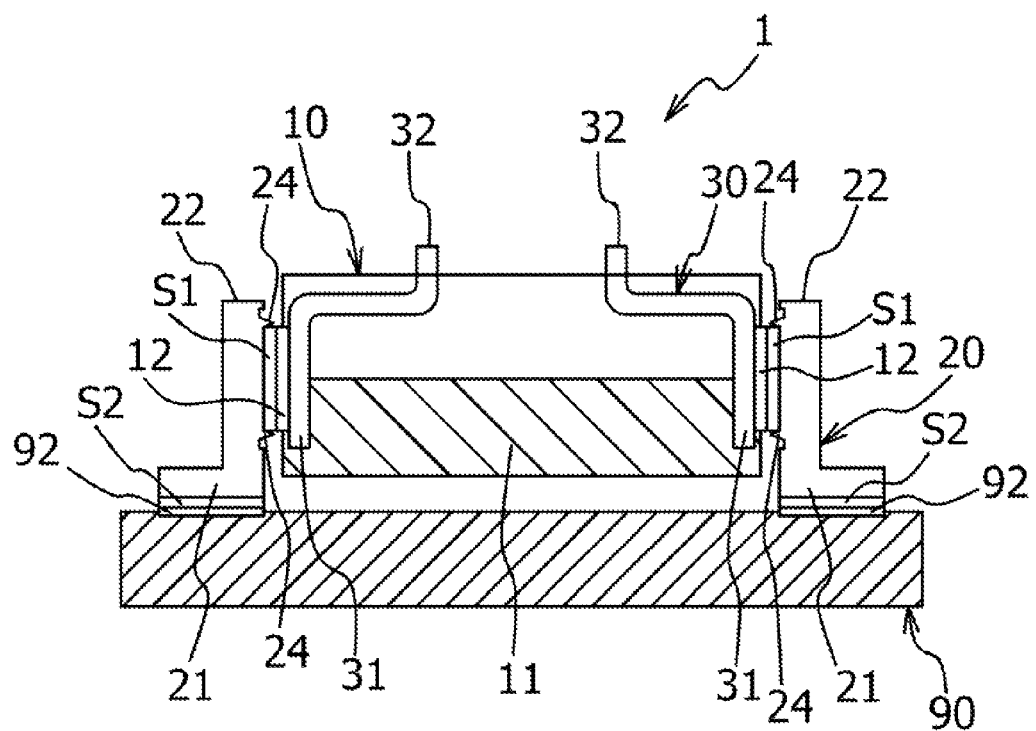

The embodiments will be described using a connector as an example of an electronic component. FIGS. 1A and 1B are illustrations describing a connector 1. FIG. 1B illustrates the state of the connector 1 mounted on a printed board 90.

As illustrated in FIGS. 1A and 1B, the connector 1 includes a body 10, a plurality of leads 20 fixed in the body 10, and pins 30 held in the body 10 and conductively coupled to the leads 20. The body 10 is a case that has an opening at the top. The body 10 is made of synthetic resin. The body 10 has a bottom wall part 11, and fixed ends 31 of the pins 30 are force fit into holes formed into the bottom wall part 11. Free ends 32 stick out of the top of the body 10. The pins 30 are made of metal. Conductive pads 12 are provided on a side of the body 10. As illustrated in FIG. 1A, the conductive pads 12 are fixed on opposite sides of the body 10. The number of conductive pads 12 equals the number of leads 20 as well as the number of pins 30. The conductive pads 12 are joined to the leads 20 with solder S1. In this way the leads 20 and the pins 30 are electrically coupled. Since the conductive pads 12 are joined to the leads 20 by the solder S1, if the solder S1 is melted, the leads 20 are able to move in respect to the body 10. Bottom ends 21 of the leads 20 are joined to electrodes 92 of the printed board 90 by solder S2. The connector 1 is mounted on the surface of the printed board 90. As illustrated in FIG. 1B, the leads 20 are each provided with two projecting parts 24 that sandwich the solder S1.

Figure 2A:
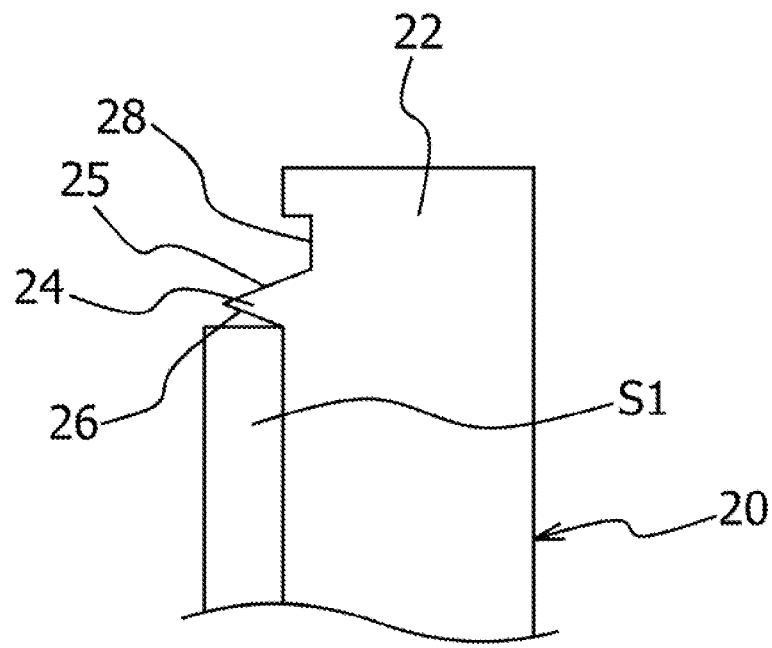
FIGS. 2A and 2B are enlargements of an area near a projecting part.
Figure 2B:
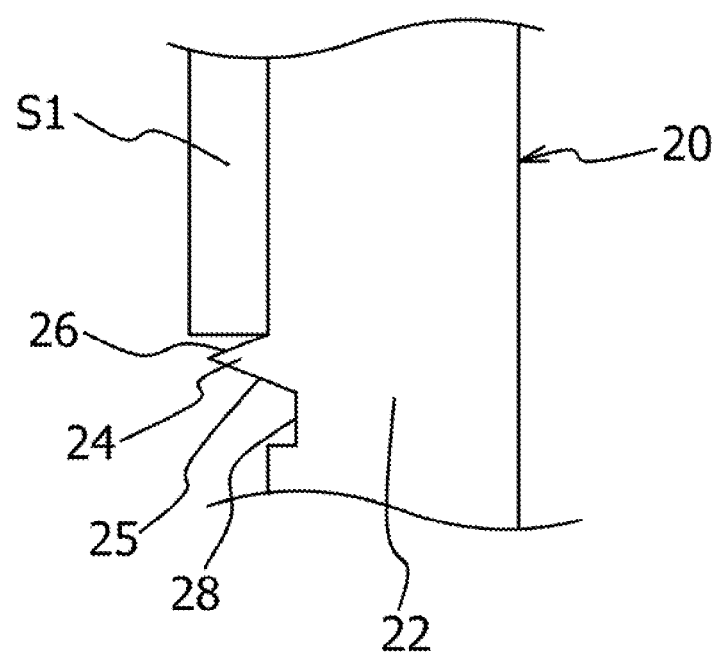

FIGS. 2A and 2B are enlargements of an area near the projecting part 24. FIG. 2A illustrates the projecting part 24 provided at a position toward an upper end 22 of the lead 20. FIG. 2B illustrates the projecting part 24 provided at a position toward the bottom end 21 of the lead 20. As illustrated in FIG. 2A, the projecting part 24 has a first slope section 25 and a second slope section 26 that slope toward each other and meet to define the projecting part 24. Also, a recess 28 is formed next to the first slope section 25 of the projecting part 24. Similarly, as illustrated in FIG. 2B, the recess 28 is also provided next to the first slope section 25 of the projecting part 24 provided at the position toward the bottom end 21 of the lead 20.

Figure 3A:
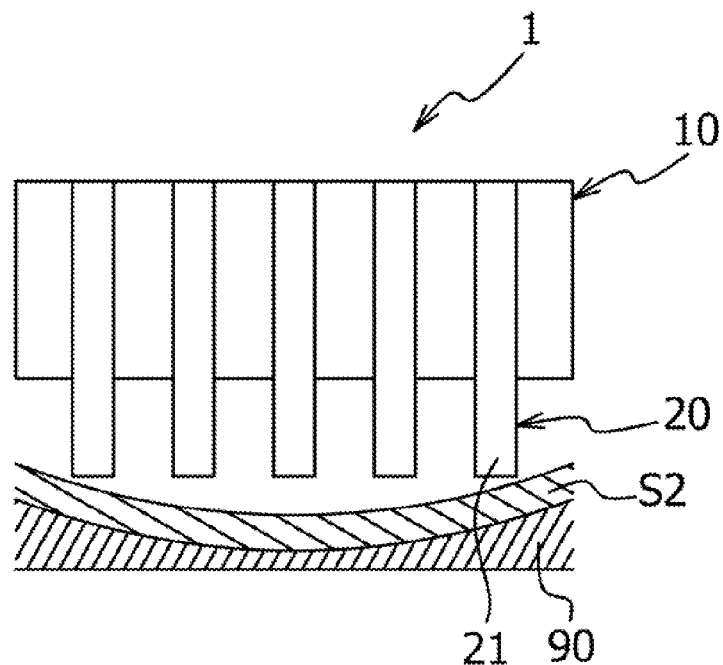
FIGS. 3A and 3B are illustrations describing the mounting of the connector to a printed board.
Figure 3B:
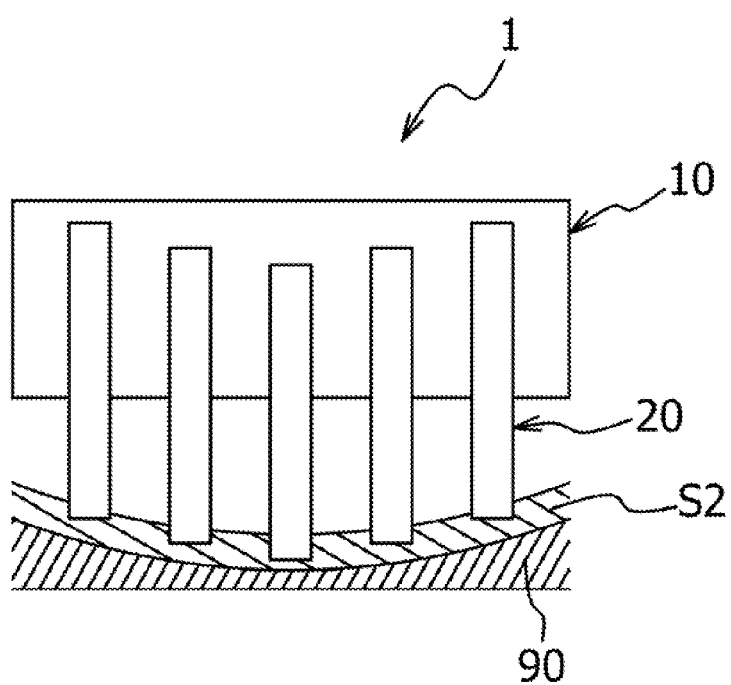

Mounting of the connector 1 on the printed board 90 will be explained. FIGS. 3A and 3B are illustrations describing the mounting of the connector 1 to the printed board 90. When mounting the connector 1 to the printed board 90, the connector 1 is placed on the solder S2 that is previously printed or coated on the surface of the printed board 90. The bottom ends 21 of the leads 20 touch the solder S2. However, as illustrated in FIG. 3A, if the printed board 90 is warped, some of the plurality of leads 20 may not touch the solder S2. When reflowing of the connector 1 and the printed board 90 is conducted in this state, the solder S2 melts and the solder S1 that joins the leads 20 and the body 10 also melts. Due to the melting of the solder S1, the leads 20 move downward under their own weight in respect to the body 10. Accordingly, the leads 20 that were not touching the solder S2 on the printed board 90 before the reflowing move downward and touch the solder S2 as illustrated in FIG. 3B. When the connector 1 and the printed board 90 are cooled in this state, all the leads 20 are joined to the solder S2. As described above, since the leads 20 are able to move in respect to the body 10, an electrical connection between the connector 1 and the printed board 90 may be assured even when the printed board is warped. Even if the solder S1 is melted, it is difficult for the leads 20 to fall off the body 10 due to surface tension of the solder S1.

Figure 4A:
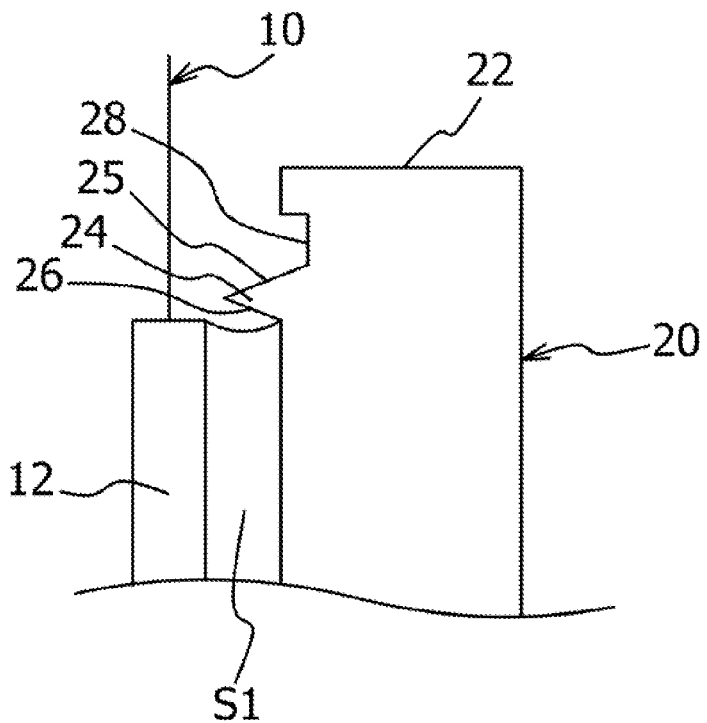
FIGS. 4A and 4B are illustrations describing movement of a lead.
Figure 4B:
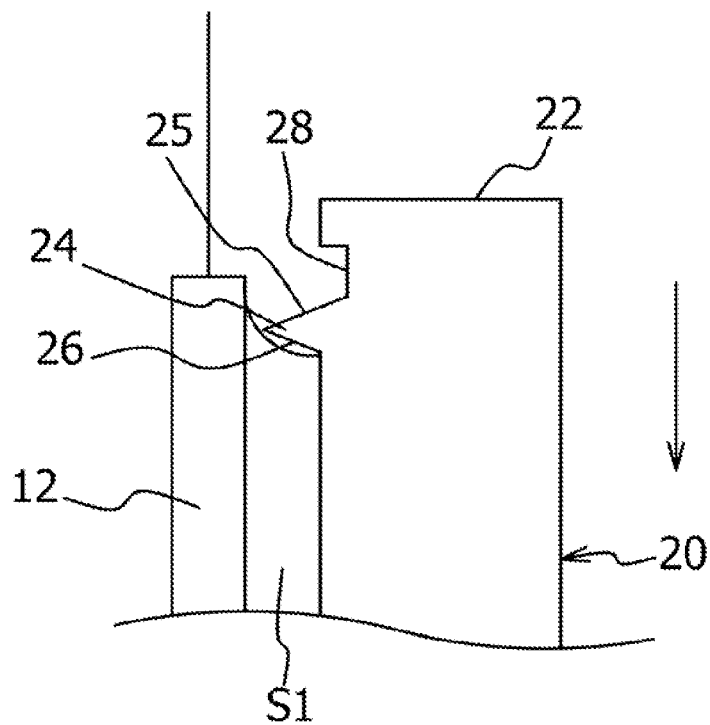

Movement of the leads 20 will be explained. FIGS. 4A and 4B are illustrations describing movements of the leads 20.

FIG. 4A illustrates the state of the solder S1 before melting. FIG. 4B illustrates the state where the solder S1 is melted and the leads 20 have moved downward in respect to the body 10. When the solder S1 melts, the solder S1 tends to flow up the leads 20 due to capillary action. In addition, as the leads 20 move downward in respect to the body 10, the solder S1 may easily flow toward the top end 22. However, the first slope section 25 is formed on each of the leads 20. Accordingly, even if the leads 20 move downward in respect to the body 10, the solder S1 may be prevented from flowing from the second slope section 26 to the first slope section 25.

Figure 5A:
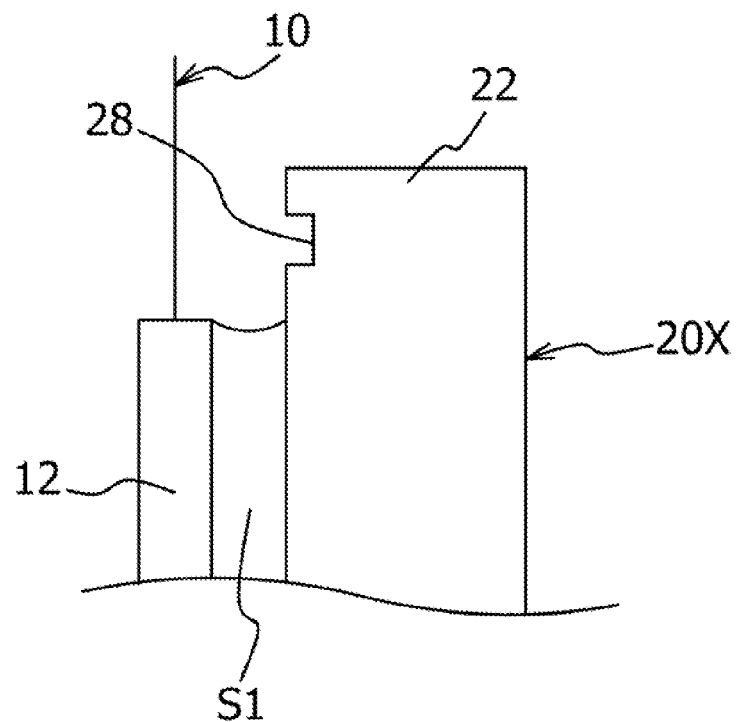
FIGS. 5A and 5B are illustrations describing movement of a lead when no projecting part is provided.
Figure 5B:
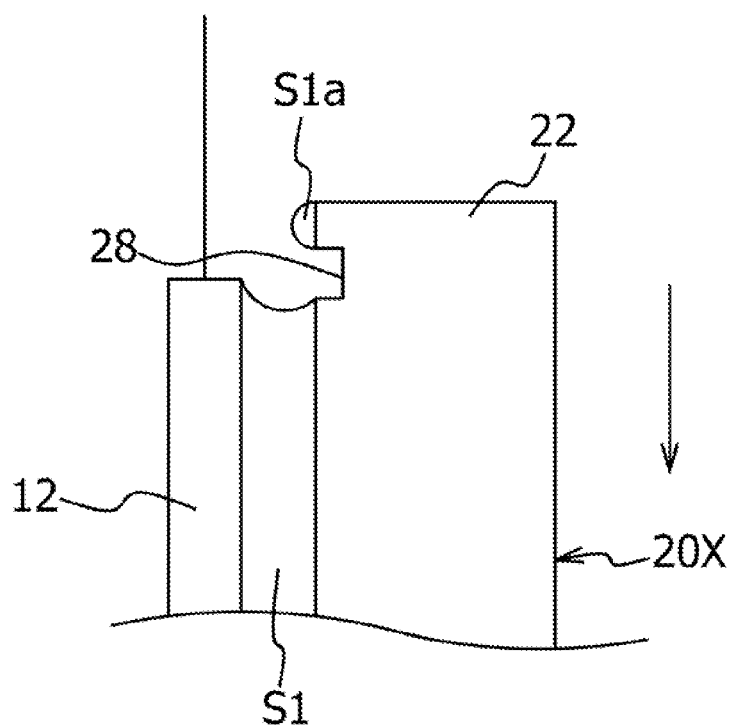

Leads 20x that are not provided with the projecting part 24 will be described. FIGS. 5A and 5B are illustrations describing movements of the lead 20x when no projecting part 24 is provided. FIGS. 5A and 5B correspond to FIGS. 4A and 4B. Each of the leads 20 is provided with two projecting parts 24, but the leads 20x are not provided with projecting parts 24. As illustrated in FIG. 5B, when the solder S1 melts, the solder S1 crosses over to the upper end 22 of the lead 20 due to capillary action. Accordingly, solder S1a may become separated from the solder S1. In this state, when solder S1 and solder S1a are cooled and the conductive pad 12 and the lead 20x are joined, the solder S1a does not contribute to the joining of the conductive pad 12 and the lead 20x. Thus, the amount of solder S1 joining the conductive pad 12 and the lead 20x is reduced.

However, as illustrated in FIG. 4B, since the leads 20 of the connector 1 of the present embodiment have projecting parts 24, the reduction of the amount of solder S1 contributing to the joining of the conductive pad 12 and the lead 20 may be prevented. Also, each of the leads 20 has the projecting part 24 at a position toward the bottom end 21 as illustrated in FIG. 2B. Thus, the melted solder S1 may be prevented from flowing to the bottom side of the lead 20.

The amount of movement of the lead 20x that is not provided with the projecting part 24 may be about ±0.4 mm. On the other hand, movement of the lead 20 that is provided with the projecting part 24 may be about ±0.6 mm. Thus, the connector 1 of the present embodiment may be appropriately mounted even onto a printed board with a large warp. Accordingly, the yield for mounting the connector 1 onto the printed board 90 is improved.

Figure 6:
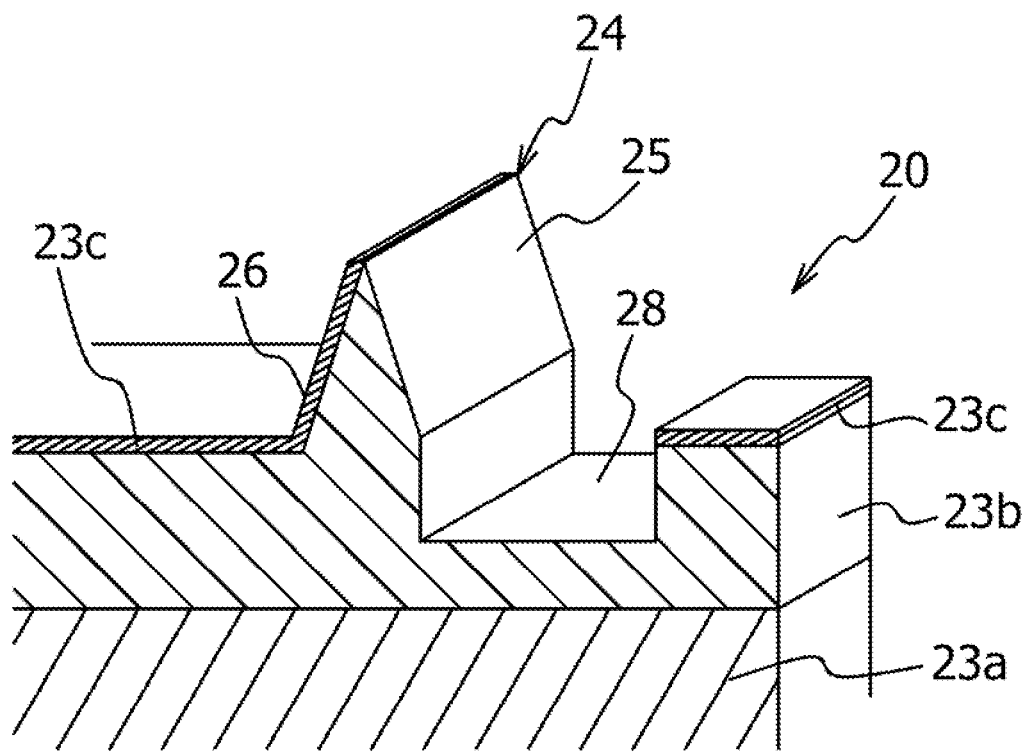
FIG. 6 is a cutaway drawing illustrating an area near a projecting part of a lead.

Details of the first slope section 25 will be explained. FIG. 6 is a cutaway view of the area near the projecting part 24 of the lead 20. As illustrated in FIG. 6, the lead 20 has a base material 23a, a Ni layer 23b laminated on the outer side of the base material 23a, and a Au layer 23c laminated on the outer side of the Ni layer 23b. The base material 23a corresponds to the base material of the lead 20. The Ni layer 23b is laminated on the base material 23a by plating. Similarly, the Au layer 23c is laminated on the Ni layer 23b by plating. The Ni layer 23b is exposed on the first slope section 25. The Au layer 23c covers the Ni layer 23b on the second slope section 26. The Au layer 23c has a higher wettability than the Ni layer 23b. In other words, the solder wettability of the first slope section 25 is lower than the second slope section 26. The angle between the first slope section 25 and the second slope section 26 is an acute angle.

The solder wetting angle will be explained.

Figure 7A:
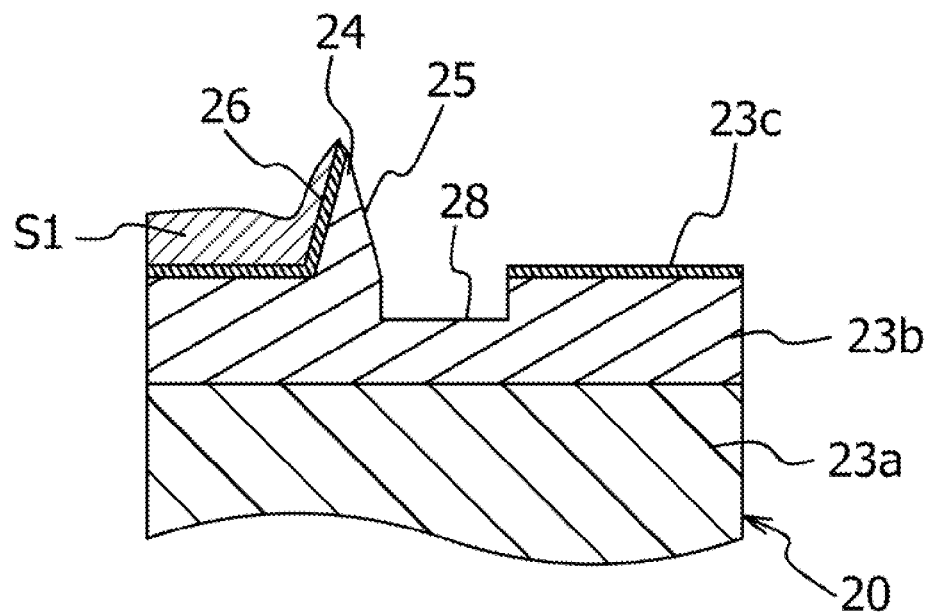
FIGS. 7A and 7B are illustrations describing a wetting angle of solder.
Figure 7B:
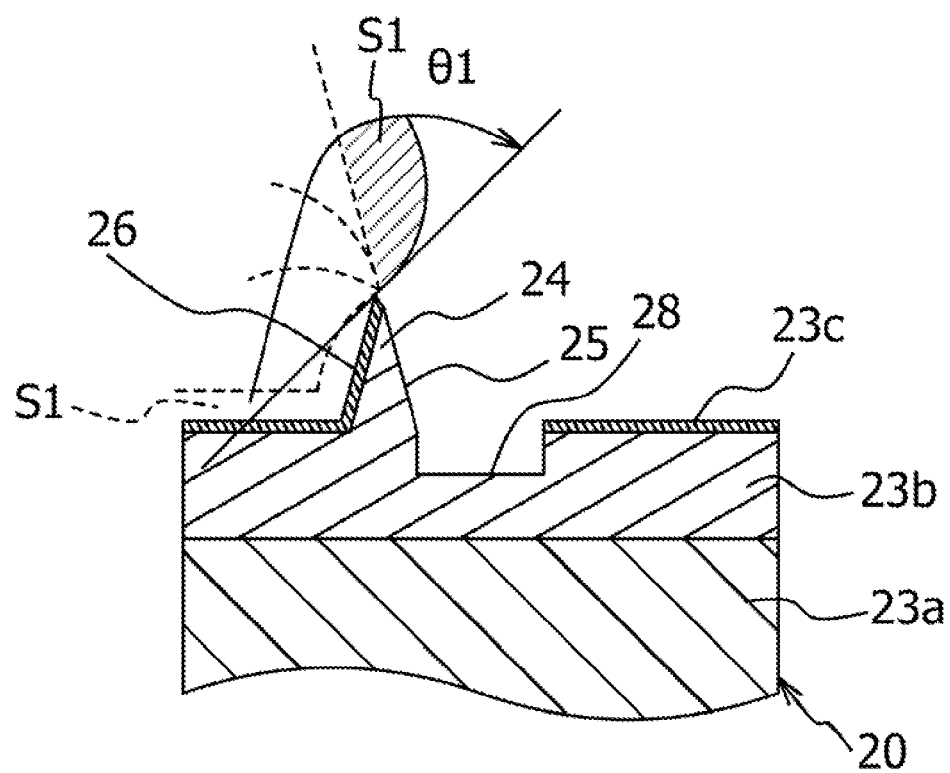

FIGS. 7A, 7B, 8A, and 8B are illustrations describing the wetting angle of solder. FIGS. 7A and 7B are explanatory drawings of the wetting angle of solder on the lead 20 having the projecting part 24. As illustrated in FIG. 7A, it is assumed that the melted solder S1 flows from the second slope section 26 to the first slope section 25 due to capillary action and the movement of the lead 20. In this case, the angle θ1 between the wetting angle of the solder S1 on the second slope section 26 and the wetting angle of the first slope section 25 is a relatively large angle.

Figure 8A:
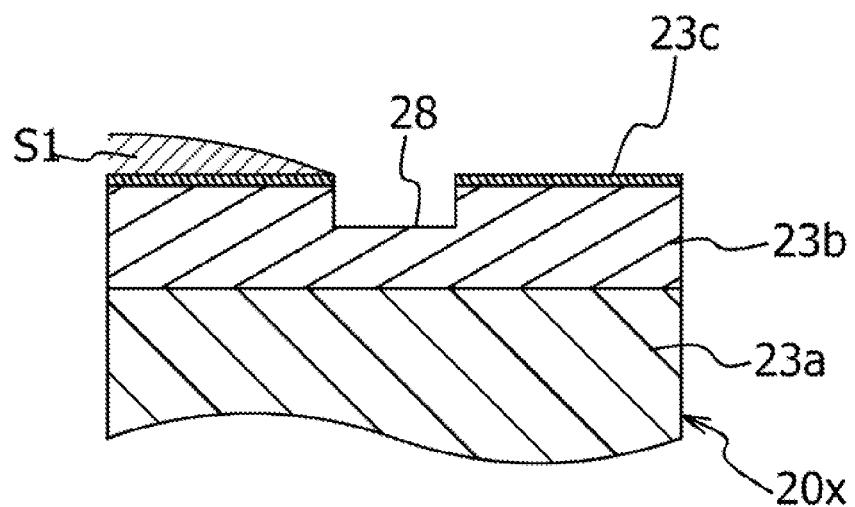
FIGS. 8A and 8B are illustrations describing a wetting angle of solder.
Figure 8B:
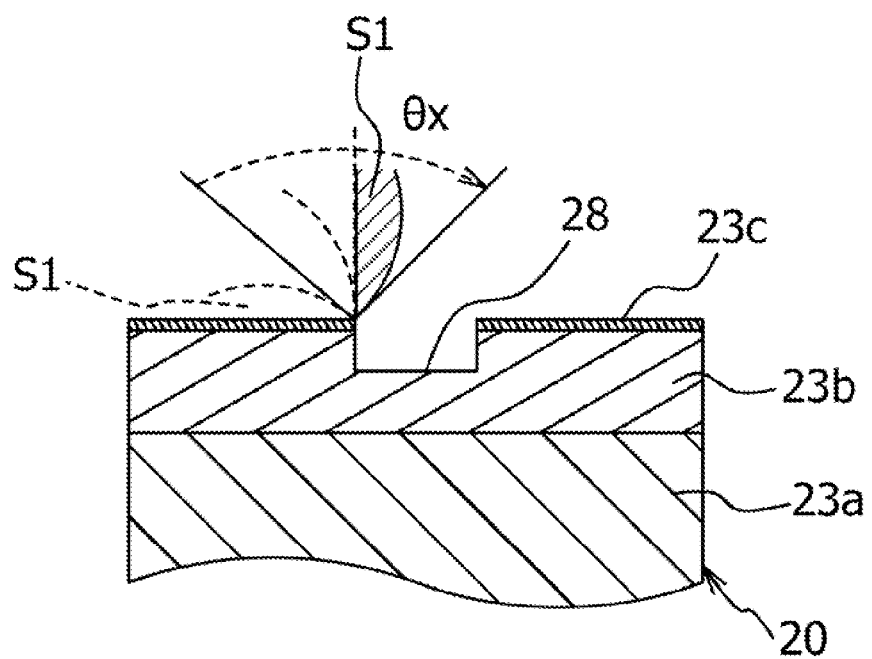

FIGS. 8A and 8B are illustrations describing the solder wetting angle for leads without projecting parts 24. As illustrated in FIGS. 8A and 8B, when no projecting part 24 is provided, the angle θx between the wetting angle of the solder S1 in front of the recess 28 and the wetting angle of the solder S1 flowing on the inside surface of the recess 28 is relatively small.

Accordingly, although the solder may easily flow into the recess 28, it is difficult for the melted solder S1 to flow from the second slope section 26 to the first slope section 25. Thus, provision of the projecting part 24 prevents the melted solder from flowing over the projecting part 24. Also, as described above, the solder wettability of the first slope section 25 is lower than the second slope section 26. Thus, it is difficult for the solder to flow from the second slope section 26 to the first slope section 25. Furthermore, the angle between the first slope section 25 and the second slope section 26 is an acute angle. Thus, the angle between the solder S1 wetting angle on the first slope section 25 and the wetting angle of the solder on the second slope section 26 is relatively large. Accordingly, it is difficult for the solder S1 to flow from the second slope section 26 to the first slope section 25.

Also, since the recess 28 is provided next to the projecting part 24 on the lead 20, even assuming that the melted solder crosses over the projecting part 24 and flows into the recess 28, the solder stays inside the recess 28, which may prevent the occurrence of contact defects due to the dispersion of solder.

Similarly, as illustrated in FIG. 2B, the projecting part 24 and the recess 28 are provided at the position toward the bottom end 21 of the lead 20. Accordingly, the melted solder 51 and S2 may be prevented from flowing together due to reflowing. Also, flow of the solder S2 onto the lead 20 and the occurrence of joint defects between the lead 20 and the printed board 90 may be prevented.

A first layer is a metal layer that includes at least one of Ni, Fe, Zn, Cr, Al, Be, Mo, and W. A second layer is a metal layer that includes at least one of Au, Ag, Cu, Pd, Sn, and Pb.

A base unit that includes the connector 1 and the printed board 90 may be used for information processing devices such as personal computers and servers. In addition, the leads 20 may also be used not only for connectors, but also in chip packages that have semiconductor chips.

The above-described projecting part 24 may be provided on semiconductor chips and leads having one end sealed with resin. This type of lead is different from the above lead 20 in that such leads do not move in respect to the body. When melting solder to join the printed board and the lead, the melted solder may be prevented from flowing onto the lead due to the provision of the projecting part even for leads with resin-sealed ends.

Figure 9:
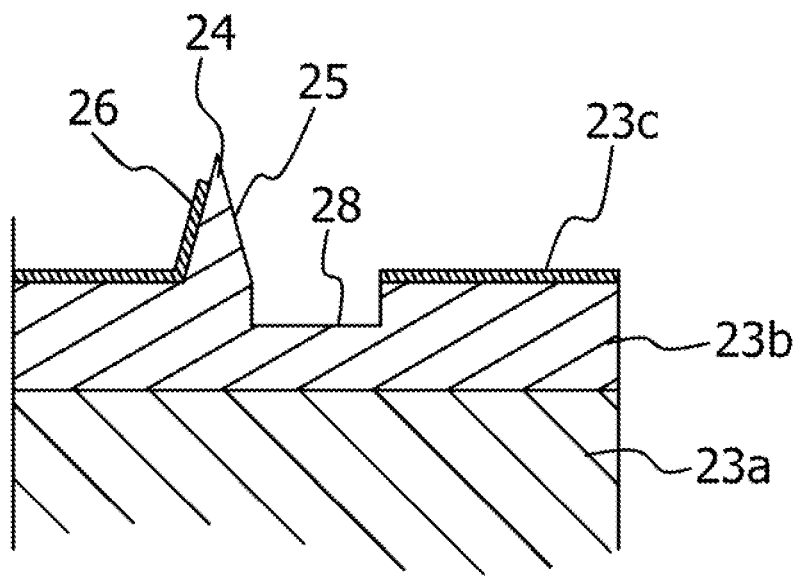
FIG. 9 is a cross-section of another example of the area near the projecting part.

FIG. 9 is a cross-section of another example of the area near the projecting part 24.

As illustrated in FIG. 9, a portion of the Ni layer 23b is exposed on the second slope section 26. The first slope section 25 does not have a Au layer 23c and the Ni layer 23b is exposed. Even in this case, the first slope section 25 has lower wettability than the second slope section 26 since the Ni layer 23b of the second slope section 26 is partially covered by the Au layer 23c. Thus, flow of the melted solder from the second slope section 26 to the first slope section 25 is prevented.

Figure 10A:
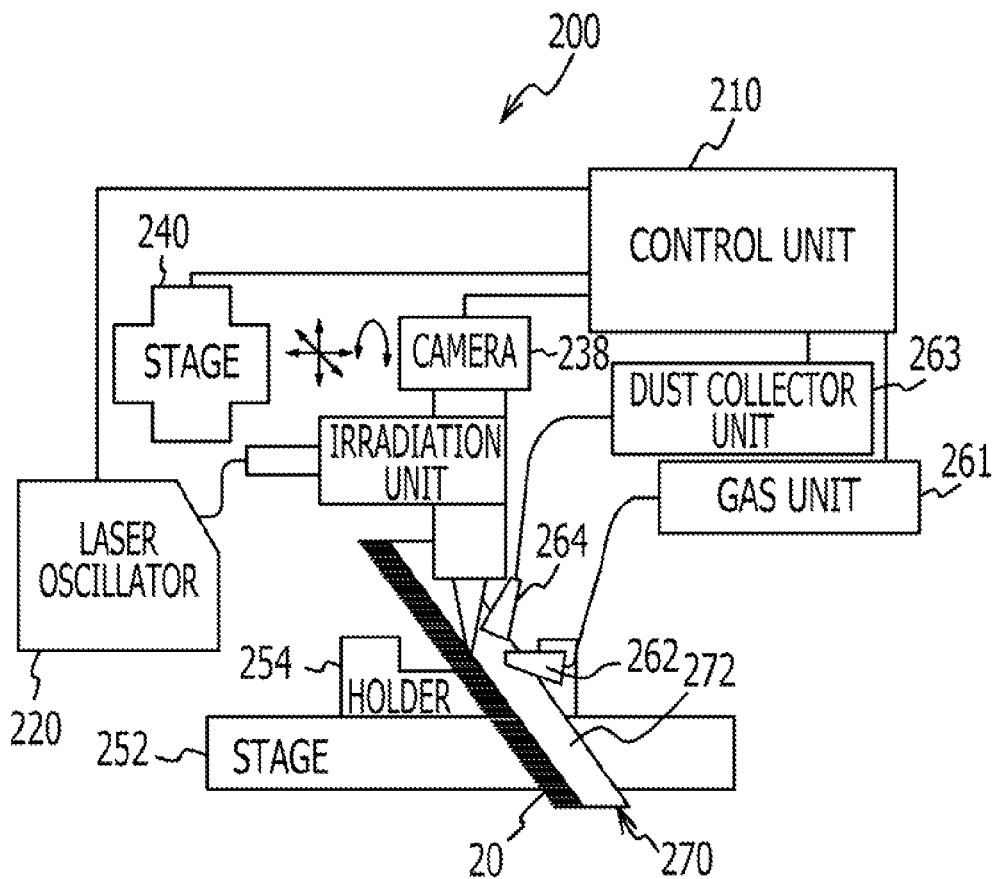
FIG. 10A is an illustration describing an electronic component lead manufacturing device.

A manufacturing device and a manufacturing method for this type of lead will be described. A projecting part of an electronic component lead may be formed using the manufacturing device and manufacturing method described below. FIG. 10A is an illustration describing an electronic component lead manufacturing device.

A manufacturing device 200 includes a control unit 210, a laser oscillator 220, an irradiation unit 230, a stage 240, a stage 252, and a holder 254. The control unit 210 includes a CPU, a ROM, a RAM, and the like. The control unit 210 controls all the operations of the manufacturing device 200.

The laser oscillator 220 outputs a laser beam in response to a command from the control unit 210. The irradiation unit 230 delivers the laser beam output from the laser oscillator 220 to a workpiece 270. The irradiation unit 230 includes a camera 238.

The stage 240 moves the irradiation unit 230 in response to commands from the control unit 210 to regulate the positional relation between the irradiation unit 230 and the lead 20. The stage 240 is able to move the irradiation unit 230 in x, y, and z directions.

The workpiece 270 includes a thin plate part 272 and the plurality of leads 20 that are integrally formed with the thin plate part 272 along an edge of the thin plate part 272. The thickness of the thin plate part 272 is 0.2 mm. The workpiece 270 is made of metal. The base material of the workpiece 270 is Cu with a Ni layer plating on the base material and a Au layer plating on the Ni layer. The thickness of the Ni layer is 5 μm and the thickness of the Au layer is 0.05 μm. The plurality of leads 20 are placed approximately parallel to each other. The holder 254 firmly holds the workpiece 270. The stage 252 carries the workpiece 270 and the holder 254 in a given direction according to commands from the control unit 210. The plurality of leads 20 moves when the holder 254 moves. More specifically, the stage 252 carries the holder 254 in the direction in which the plurality of leads 20 are aligned.

A gas unit 261 and a dust collector unit 263 are connected to the control unit 210. The gas unit 261 and the dust collector unit 263 are connected to nozzles 262 and 264, respectively. The gas unit 261 discharges nitrogen gas to the leads 20 during laser processing to prevent the oxidization of the leads 20. The gas unit 261 may also discharge argon or helium to prevent oxidization of the leads 20, or discharge oxygen to allow oxidization of portions undergoing laser processing. The dust collector unit 263 recovers evaporation and dust due to the laser processing.

Figure 10B:
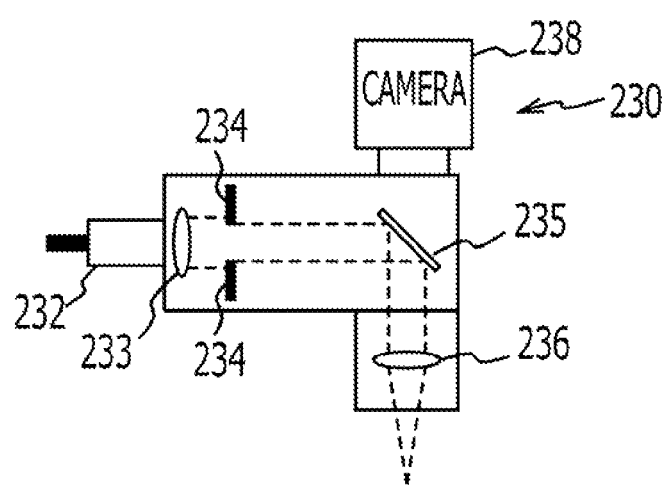
FIG. 10B is an illustration describing an irradiation unit.

The irradiation unit 230 will be explained in detail. FIG. 10B is an illustration describing the irradiation unit 230. The irradiation unit 230 includes a fiber unit 232, a collimating lens 233, masks 234, a mirror 235, a condensing lens 236, and the camera 238. The fiber unit 232 is coupled to the laser oscillator 220 by optical fiber. The laser beam emitted from the fiber unit 232 is collimated by the collimating lens 233.

The masks 234 change the shape of the intensity distribution of the laser beam emitted from the fiber unit 232 from a Gaussian shape to a top hat shape. The mirror 235 reflects the laser beam toward the workpiece 270. The condensing lens 236 condenses the laser beam close to the lead 20.

A procedure for manufacturing electronic component leads will be explained.

Figure 11:
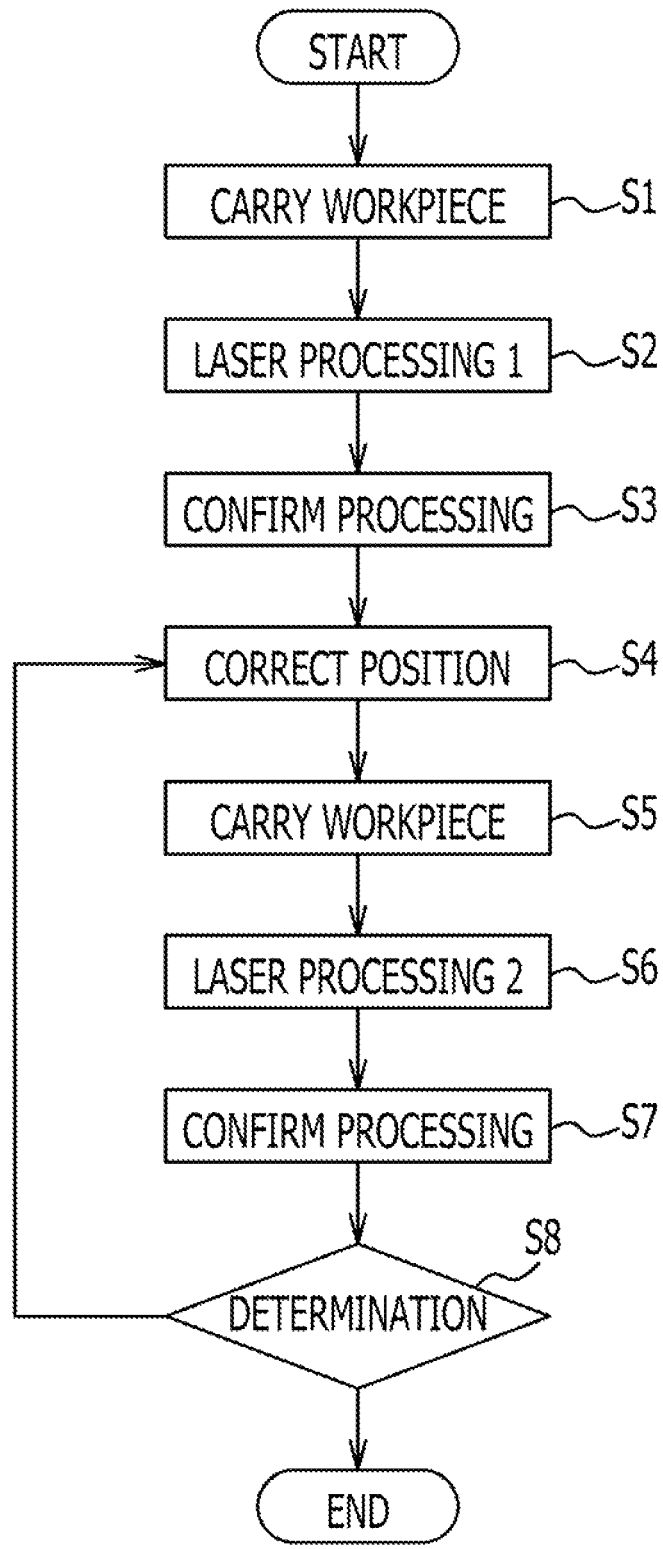
FIG. 11 is an illustration describing lead manufacturing procedures.

FIG. 11 is an illustration describing a lead manufacturing procedure.

While the stage 252 carries the workpiece 270 at approximately 8 mm/sec (Step S1), laser processing is conducted on the lead 20 using a first laser beam from the laser oscillator 220 and the irradiation unit 230 (Step S2). Nitrogen gas is discharged by the gas unit 261 and dust is recovered by the dust collector unit 263 while the laser processing is taking place.

The type of laser beam may be a Nd-YAG (1064 nm) for example. The pulse frequency may be for example 2 kHz, the pulse width may be 100 ns, and the output may be 1.0 W. The shape of the intensity distribution of the laser beam output from the fiber unit 232 is a Gaussian shape.

Figure 12A:
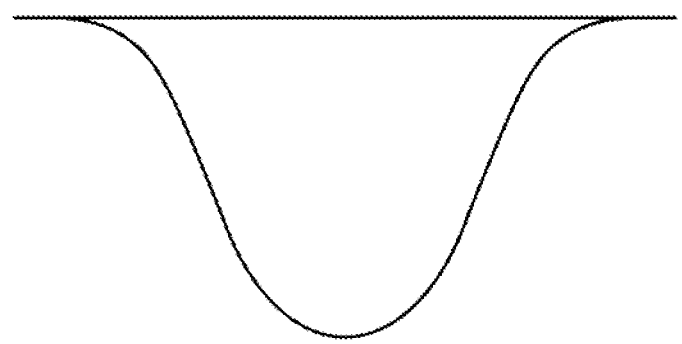
FIGS. 12A and 12B are illustrations describing laser beam intensity distribution.
Figure 12B:
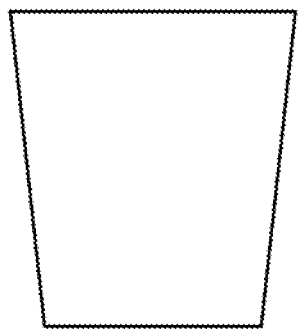

The shape of the intensity distribution of the laser beam output from the fiber unit 232 is changed to a top hat shape by the masks 234. FIG. 12A illustrates a Gaussian shape laser beam intensity distribution, and FIG. 12B illustrates a top hat shape laser beam intensity distribution. By cutting off a part of the laser beam with the masks 234, the shape of the laser beam intensity distribution becomes a top hat shape. With a top hat shaped laser beam intensity distribution, the intensity of the laser beam becomes substantially equal. As illustrated in FIG. 12B, when the shape of the laser beam intensity distribution is a top hat shape, the foot is small and the edges of the laser beam are steep. Accordingly, portions of the lead may be melted in narrow ranges and projecting parts may be formed at the periphery of a region irradiated by the laser beam.

FIGS. 13A to 13D are illustrations describing laser processing.

Figure 13A:
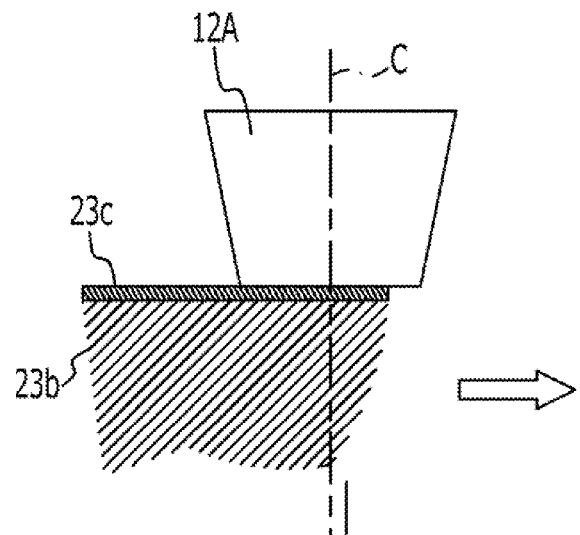
FIGS. 13A to 13D are illustrations describing laser processing.
Figure 13B:
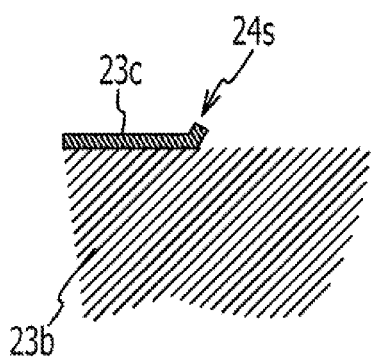

As illustrated in FIG. 13A, the top hat shape of a first laser beam 12A is condensed on the surface of the lead 20 on the workpiece 270. Accordingly, as illustrated in FIG. 13B, the Au layer 23c is vaporized and removed. In this way, the Ni layer 23b is exposed in the spot irradiated by the first laser beam 12A. A small protrusion 24s is formed at the edge of the region irradiated by the first laser beam 12A. The first laser beam 12A is delivered for the purpose of removing the Au. The first laser beam 12A may be a short pulse laser or a femto laser.

An operator confirms the processing state of the first laser beam 12A based on an image from the camera 238 (Step S3) and changes the irradiating position of the irradiation unit 230 (Step S4).

The irradiating position of the irradiation unit 230 is changed as follows.

Figure 13C:
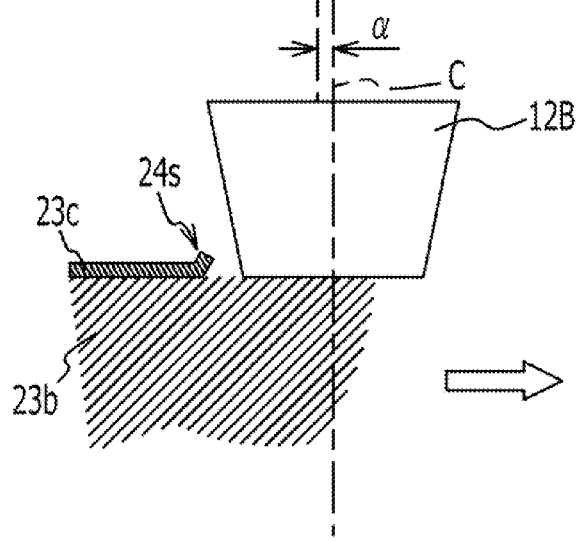

As illustrated in FIG. 13C, the irradiating position of a second laser beam 12B is changed from the irradiating position of the first laser beam 12A. In other words, the second laser beam 12B is delivered at a position away from the small protrusion 24s. The distance between an optical axis C of the second laser beam 12B and an optical axis C of the first laser beam 12A is shifted by an amount α, and then the second laser beam 12B is delivered. For example, α is 5 μm. The second laser beam 12B is delivered to the exposed Ni layer 23b. The second laser beam 12B is delivered for the purpose of hot melt processing of the Ni. The second laser beam 12B may have a long pulse width of 1 nanosecond or more, or may have continuous waves.

Figure 13D:
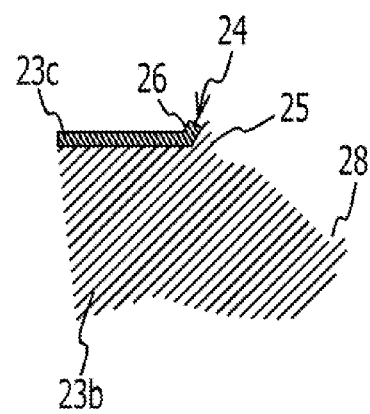

Next, while the workpiece 270 is being carried by the stage 252 (Step S5), the lead 20 is processed by the second laser beam 12B output by the laser oscillator 220 and the irradiation unit 230 (Step S6). As a result, the Ni layer 23b is melted, and as illustrated in FIG. 13D, the melted Ni layer 23b adheres to a sloped section of the irradiated side of the small protrusion 24s. In this way, the projecting part 24 is formed. Also, the recess 28 is formed when part of the Ni layer 23b is vaporized due to the second laser beam 12B.

Figure 14:
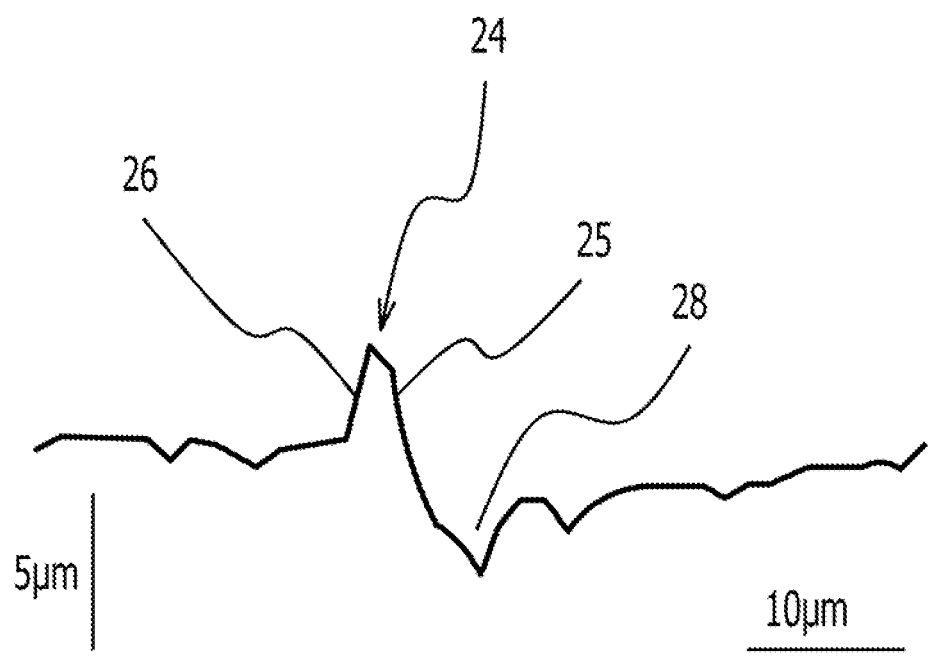
FIG. 14 is an illustration describing the shape of the area near the projecting part after processing.

Next, the operator confirms the processing state using the image from the camera 238 (Step S7). FIG. 14 illustrates the shape near the projecting part 24 after processing. The height of the projecting part 24 is approximately 4 μm, and the width is approximately 7 μm. Also, using EDS elemental analysis, the operator confirms that almost no Au is detected in the area irradiated by the laser beam.

If the operator determines that the shape of the projecting part 24 is improper based on the image from the camera 238, or determines that the height of the projecting part 24 needs to be controlled (Step S8), the steps from Step S4 onward are repeated. If the projecting part 24 is suitably formed, the leads 20 are mechanically cut away from the thin plate part 272. In this way the leads 20 are formed.

The lead manufacturing procedures described above may be automated. For example, the processing shape may be automatically measured using an image capturing device or a line profiler. Then, the suitability of the formation of the projecting part may be automatically determined by comparing actual measurements with previously input width and height thresholds of the projecting part.

Figure 15A:
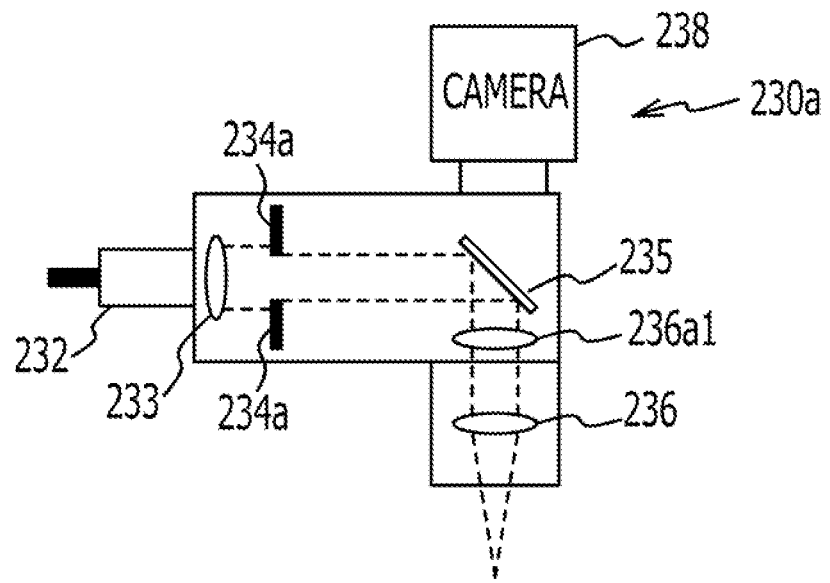
FIGS. 15A and 15B are illustrations describing a modification of the irradiation unit.
Figure 15B:
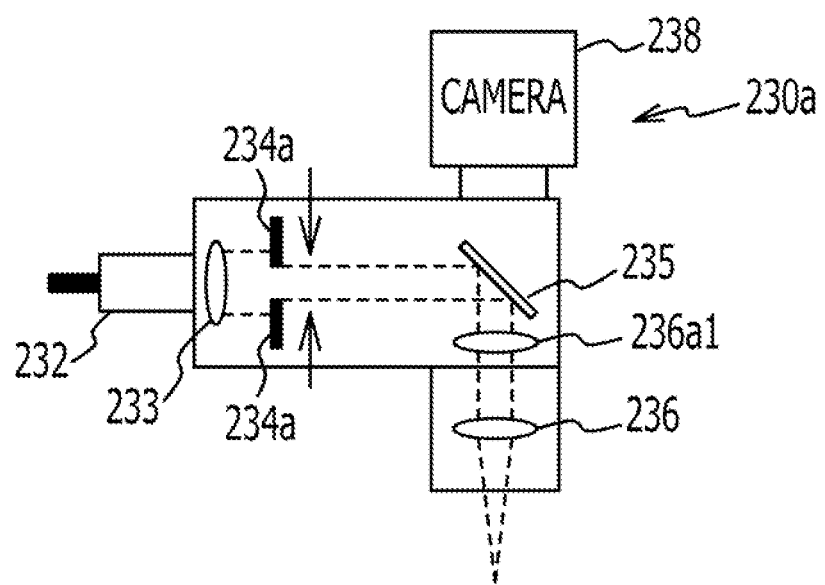

FIGS. 15A and 15B are explanatory drawings of an irradiation unit 230a according to a modification.

FIG. 15A illustrates the irradiation unit 230a when delivering the first laser beam. FIG. 15B illustrates the irradiation unit 230a when delivering the second laser beam.

Masks 234a provided in the irradiation unit 230a are movable in the direction perpendicular to the optical axis of the laser beam passing through the collimating lens 233. By moving the masks 234a, the spot diameter of the laser beam delivered onto the lead 20 may be changed. An imaging lens 236a1 is provided between the condensing lens 236 and the mirror 235.

Figure 16A:
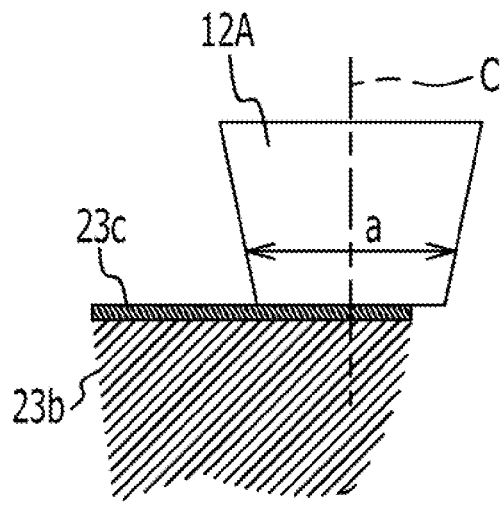
FIGS. 16A to 16C are illustrations describing a processing method.
Figure 16B:
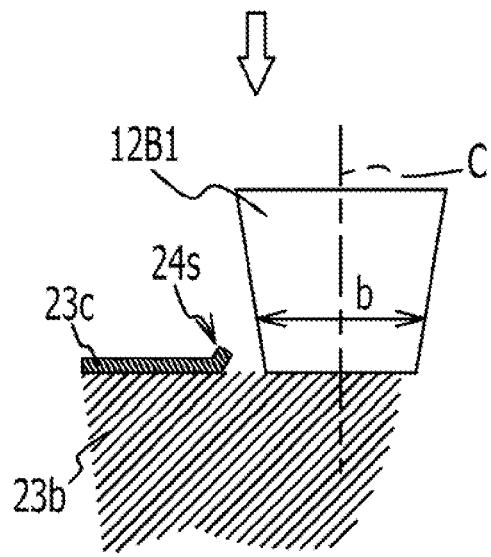
Figure 16C:
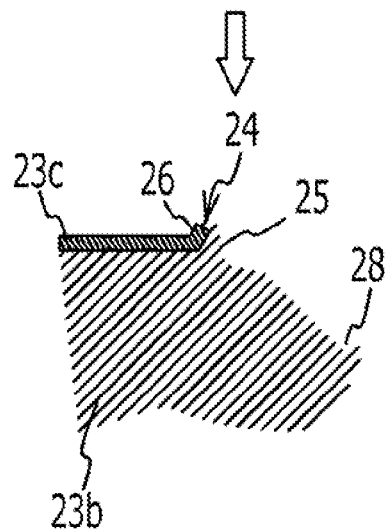

FIGS. 16A and 16B are explanatory drawings of a processing method.

The positions of the masks 234a are adjusted so that the spot diameter is dimension "a" in the first laser beam 12A. In a second laser beam 12B1, the positions of the masks 234a are adjusted so that the spot diameter becomes dimension "b" which is smaller than dimension "a". Specifically, as illustrated in FIG. 15B, the masks 234a are moved closer to the optical axis of the laser beam when the second laser beam 12B1 is being delivered. The optical axes of the first laser beam 12A and the second laser beam 12B1 are in the same position. In this way, since the spot diameter of the second laser beam 12B1 differs from the spot diameter of the first laser beam 12A, the second laser beam 12B1 may be delivered at a position shifted from the small protrusion 24s. As a result, the projecting part 24 may be formed.

Figure 17:
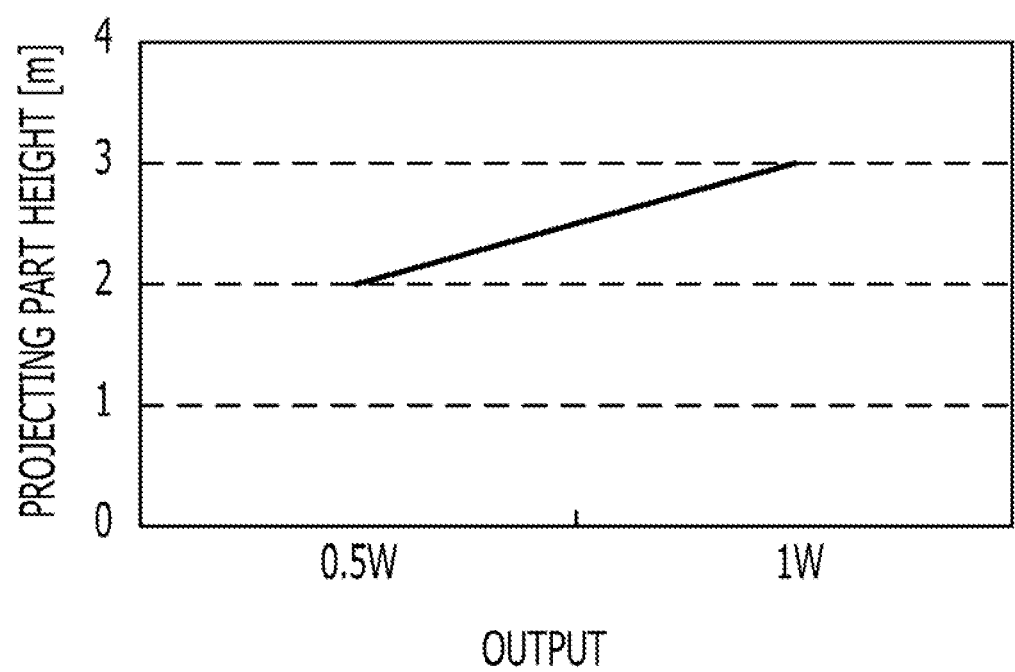
FIG. 17 is a graph illustrating a relationship between laser output and projecting part height.

FIG. 17 is a graph illustrating a relationship between laser output and the height of the projecting part 24. When the laser output is 0.5 W, the height of the projecting part 24 is 2 μm. When the laser output is 1 W, the height of the projecting part is 3 μm. The higher the laser output, the higher the height of the projecting part 24.

Figure 18:
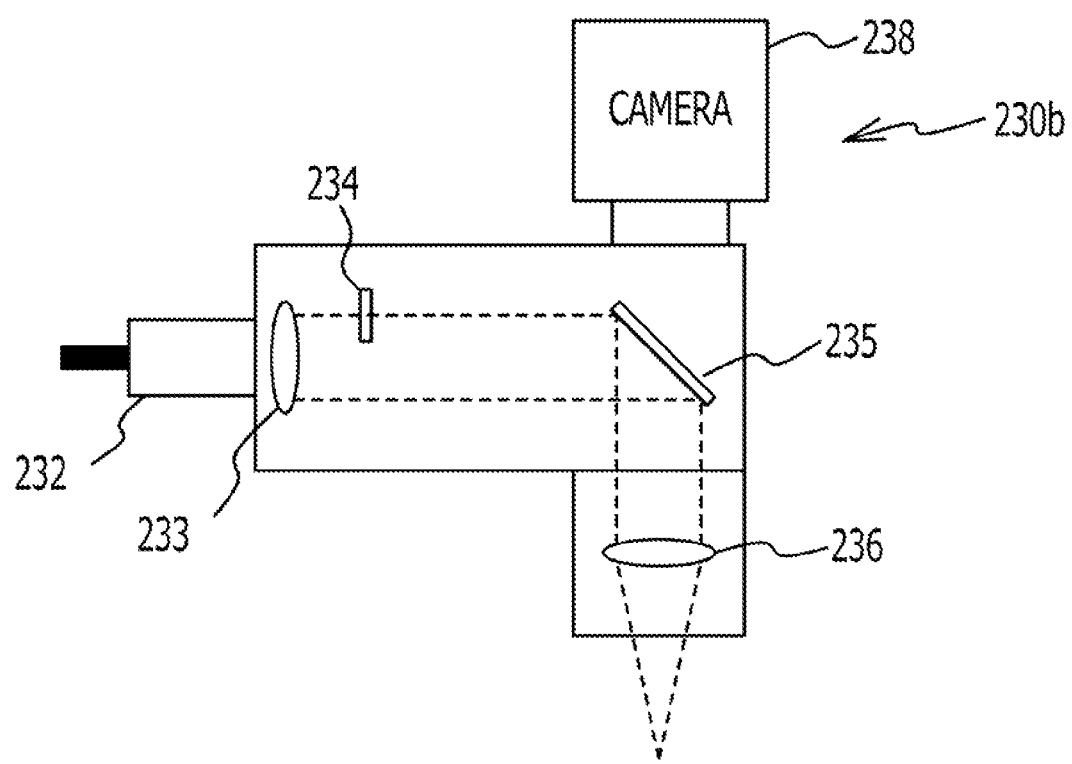
FIG. 18 is an illustration describing a modification of the irradiation unit.

FIG. 18 is an illustration describing an irradiation unit 230b according to a modification.

The irradiation unit 230b has only one mask 234. Therefore, the shape of the laser beam intensity distribution is a top hat shape on only one side of the center optical axis and stays a Gaussian shape on the other side.

FIGS. 19A to 19D are illustrations describing a processing method.

Figure 19A:
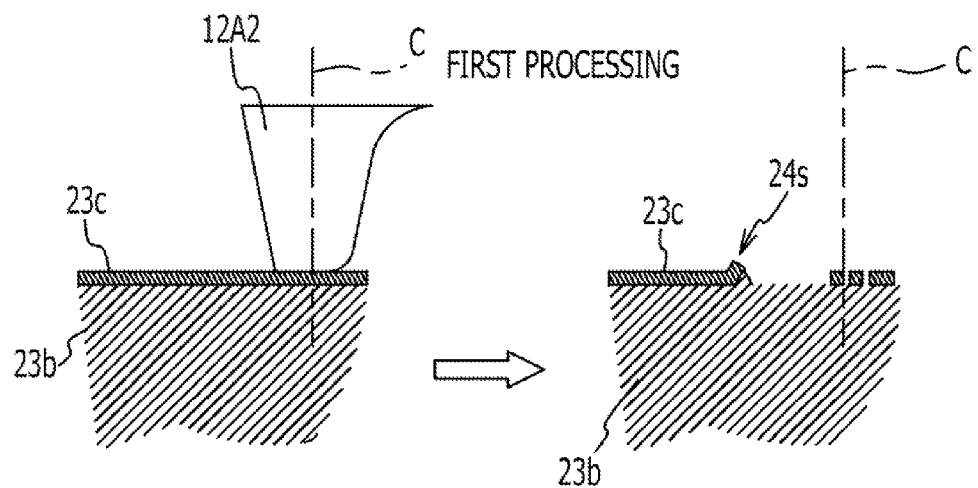
FIGS. 19A to 19D are illustrations describing a processing method.

As illustrated in FIG. 19A, the shape of the intensity distribution of a first laser beam 12A2 becomes a top hat shape only on one side of the center optical axis C. In FIG. 19A, the part on the left-hand side of the center optical axis C is a top hat shape, and the part on the right-hand side is a Gaussian shape.

Figure 19B:
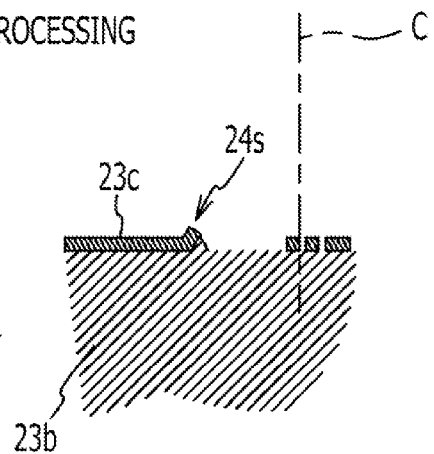
Figure 19C:
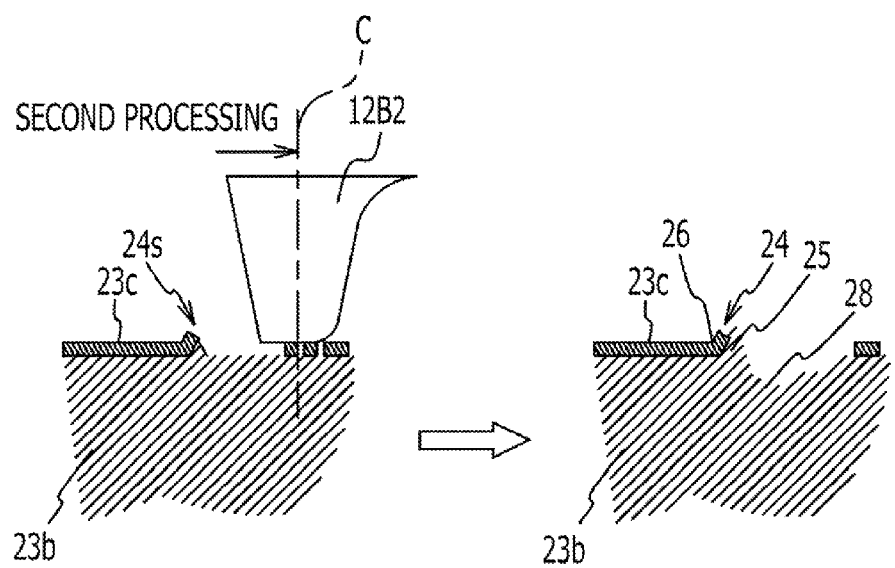
Figure 19D:
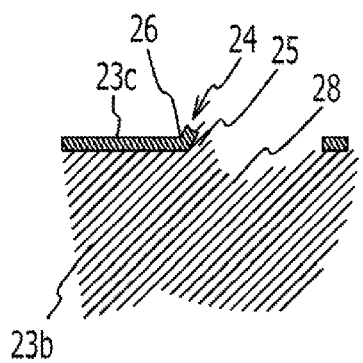

As illustrated in FIG. 19B, in the part on the left-hand side of the center optical axis C, the small protrusion 24s is formed at the edge of the region irradiated by the first laser beam 12A2. However, in the part on the right-hand side of the center optical axis C, no small protrusion is formed at the edge of the region irradiated by the first laser beam 12A2. Next, as illustrated in FIG. 19C, the irradiation unit 230b is moved, the position of the optical axis C is shifted, and the second laser beam 12B2 is delivered. As a result, the projecting part 24 is formed as illustrated in FIG. 19D.

Figure 20:
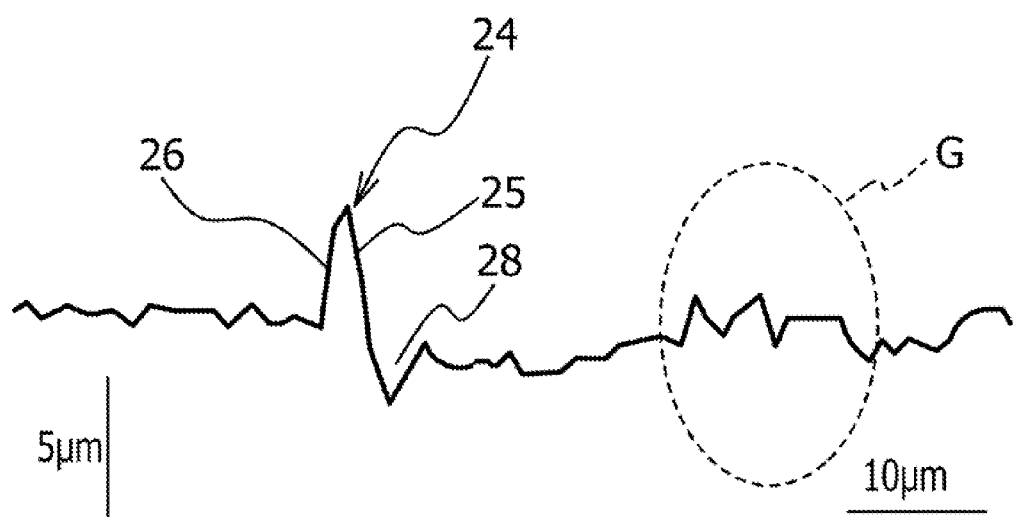
FIG. 20 is an illustration describing the shape of the area near the projecting part after processing.

FIG. 20 is an illustration describing the shape of the area near the projecting part 24 after processing.

As illustrated in FIG. 20, the projecting part 24 and the recess 28 are formed due to the top hat shape of the laser beam. However, no projecting part is formed in the portion G where the Gaussian shape laser beam is delivered.

Figure 21:
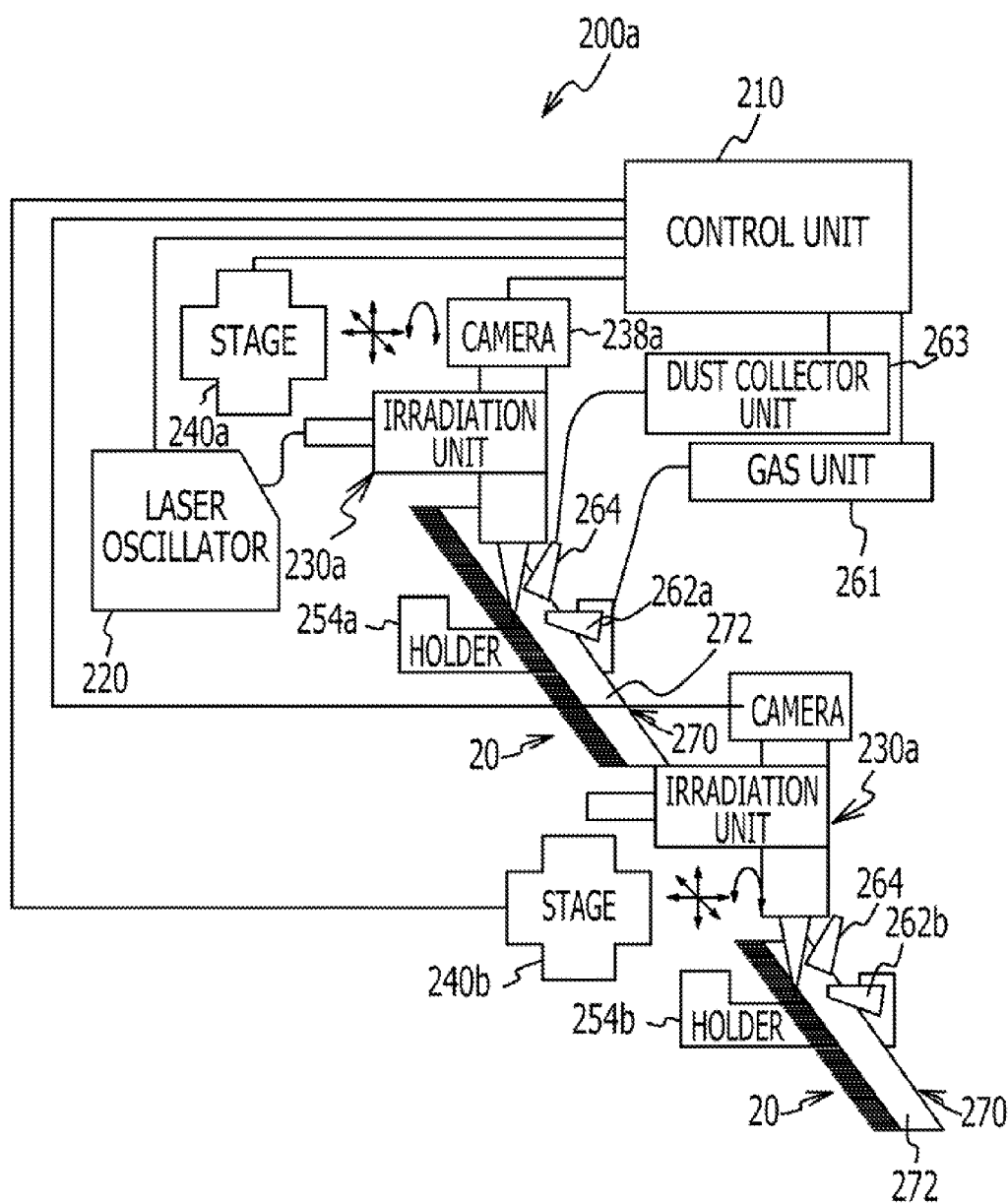
FIG. 21 is an illustration describing a modification of the manufacturing device.

A manufacturing device 200a according to a modification will be explained. FIG. 21 is an illustration describing the manufacturing device 200a according to the modification.

The manufacturing device 200a includes a first unit for delivering a first laser beam to the leads 20, and a separate second unit for delivering a second laser beam to the leads 20. The first unit includes an irradiating unit 230a, a stage 240a, and a holder 254a. The second unit includes an irradiating unit 230b, a stage 240b, and a holder 254b. The laser oscillator 220, the gas unit 261, and the dust collector unit 263 are shared by first and second units. In FIG. 21, illustration of the stages for moving each of the holders 254a and 254b is omitted. The first laser beam is delivered by the first unit and the second laser beam is delivered by the second unit.

Also, the first unit may have a non-linear optical crystal and the wavelength of the laser beam emitted from the laser oscillator 220 may be shortened. For example, the first unit may deliver a 1064 nm wavelength laser beam emitted from the laser oscillator 220 as the first laser beam with a second harmonic with a wavelength of 532 nm due to the non-linear optical crystal.

Also, the first unit may have a non-linear optical crystal and may shorten the pulse of the laser beam emitted from the laser oscillator 220. For example, the first unit may deliver the laser beam emitted from the laser oscillator 220 with a pulse width of 100 ns as the first laser beam that has a pulse width of less than one nanosecond. Subsequently, the second unit may deliver the second laser beam with a pulse width remaining at 100 ns.

Figure 22:
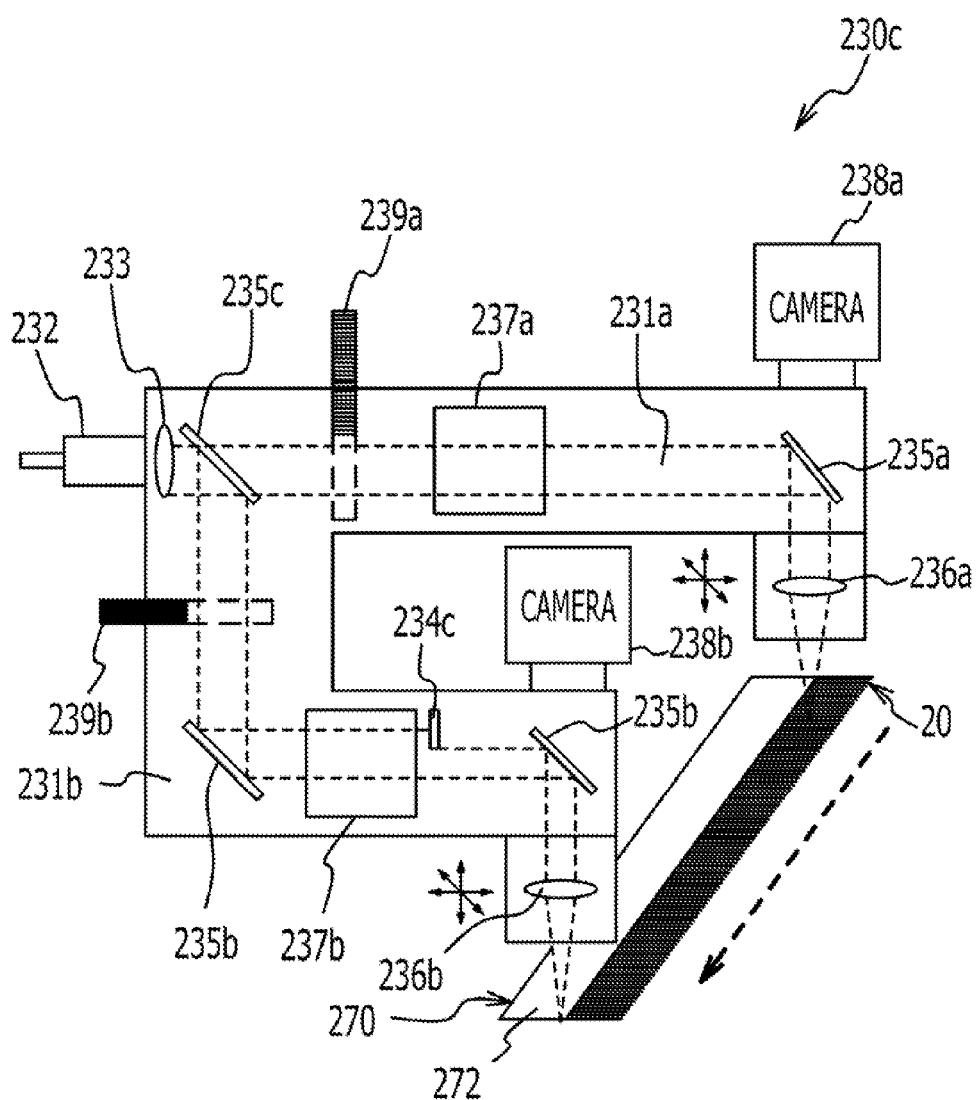
FIG. 22 is an illustration describing a modification of the irradiation unit.

An irradiation unit 230c according to a modification will be explained. FIG. 22 is an illustration describing the irradiation unit 230c according to the modification.

The irradiation unit 230c includes a first path 231a through which the first laser beam passes, and a second path 231b through which the second laser beam passes. The irradiation unit 230c includes a mirror 235c. The mirror 235c is provided to be able to be moved from a position in the light path of the laser beam that passes through the collimating lens 233. By removing the mirror 235c from the light path of the laser beam passing through the collimating lens 233, the laser beam passing through the collimating lens 233 is not reflected by the mirror 235c and advances through the first path 231a. A shutter 239a, an optical component 237a, the mirror 235a, and a condensing lens 236a are provided on the first path 231a.

Also, by providing the mirror 235c on the laser beam light path, the laser beam passing through the collimating lens 233 is reflected by the mirror 235c to advance through the second path 231b. A shutter 239b, an optical component 237b, a mask 234c, a mirror 235b, and a condensing lens 236b are provided on the second path 231b. The shutters 239a and 239b block the laser beam or allow the laser beam to pass through. The optical components 237a and 237b are able to change the wavelength, the pulse frequency, the pulse width, the output, and the shape of the intensity distribution of the laser beam, and are able to control the shape of the laser beam spot and spot diameter. The mirror 235c may be used as a half mirror to allow part of the laser beam to pass through and to reflect part of the laser beam.

According to the present embodiment, an electronic component lead manufacturing device and manufacturing method is able to manufacture an electronic component lead in which the extension of the melted solder along the lead is suppressed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

The invention claimed is:

1. An electronic component lead manufacturing method comprising:
   irradiating a first laser beam to a second layer with a solder wettability higher than a first layer, the second layer being laminated on the outside of the first layer of a lead on the electronic component, and exposing the first layer from the second layer based on the irradiating of the first laser beam; and
   forming a projecting part near a region irradiated by a second laser beam by irradiating the second laser beam to the exposed first layer.

2. The electronic component lead manufacturing method according to claim 1, wherein the first layer includes at least one of Ni, Fe, Zn, Cr, Al, Be, Mo, and W, and the second layer includes at least one of Au, Ag, Cu, Pd, Sn, and Pb.

3. The electronic component lead manufacturing method according to claim 1, wherein the second laser beam has a pulse width wider than the first laser beam, or a wavelength longer than the first laser beam.

4. The electronic component lead manufacturing method according to claim 1, further comprising,
   cutting a part of one of the first laser beam and the second laser beam using a mask so as to change one of an intensity distribution of the first laser beam and an intensity distribution of the second laser beam.

5. The electronic component lead manufacturing method according to claim 1, wherein the second laser beam has a spot diameter smaller than the first laser beam.

6. The electronic component lead manufacturing method according to claim 1, wherein a position to which the second laser beam is irradiated is different from a delivery position of the first laser beam.

* * * * *